(12) United States Patent
Fukuda et al.

(10) Patent No.: US 7,170,684 B2
(45) Date of Patent: Jan. 30, 2007

(54) PLASTIC FILM AND IMAGE DISPLAY UNIT

(75) Inventors: Kenichi Fukuda, Kanagawa (JP); Akihiro Matsufuji, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 85 days.

(21) Appl. No.: 10/513,515

(22) PCT Filed: Jun. 23, 2003

(86) PCT No.: PCT/JP03/07930

§ 371 (c)(1),
(2), (4) Date: Nov. 5, 2004

(87) PCT Pub. No.: WO04/000550

PCT Pub. Date: Dec. 31, 2003

(65) Prior Publication Data

US 2006/0056030 A1    Mar. 16, 2006

(30) Foreign Application Priority Data

Jun. 24, 2002 (JP) ............................. 2002-183070
Sep. 13, 2002 (JP) ............................. 2002-268783
Jan. 21, 2003 (JP) ............................. 2003-012625

(51) Int. Cl.
*G02B 1/10* (2006.01)

(52) U.S. Cl. ...................... 359/586; 359/589

(58) Field of Classification Search ................ 359/586, 359/589, 581
See application file for complete search history.

(56) References Cited

U.S. PATENT DOCUMENTS 4,311,907 A    1/1982    Takami et al.
5,496,641 A *  3/1996    Mase et al. ............... 428/423.1

FOREIGN PATENT DOCUMENTS

| EP | 0 518 687 A   | 12/1992 |
|----|---------------|---------|
| JP | A-7-151902    | 6/1995  |
| JP | 07 287102     | 10/1995 |
| JP | A-8-197670    | 8/1996  |
| JP | A-10-282312   | 10/1998 |
| JP | 2003-347003   | 12/2000 |
| JP | A-2001-071439 | 3/2001  |
| JP | A-2001-318207 | 11/2001 |
| JP | 2003-177209 A | 6/2003  |

* cited by examiner

*Primary Examiner*—Fayez G. Assaf
(74) *Attorney, Agent, or Firm*—Buchanan Ingersoll & Rooney PC

(57) ABSTRACT

A plastic film comprising a transparent plastic substrate, a primer layer and a functional layer in this order wherein a refractive index $n_s$ of the substrate and a refractive index $n_H$ of the functional layer satisfy the following formula (1): $0.03 \leq |n_s - n_H|$ and an average reflectance of light of from 540 to 550 nm in wavelength incidenting perpendicular onto a face of the film at an interface among the functional layer and the substrate is 0.02% or less.

12 Claims, No Drawings

PLASTIC FILM AND IMAGE DISPLAY UNIT

TECHNICAL FIELD

This invention relates to plastic films being free from the occurrence of interference spots and having an improved visibility. More specifically, it relates to a hard coat film scarcely showing any interference spots even under a three-wavelength fluorescent lamp, a plastic film provided with a pressure-sensitive adhesive layer, a plastic film provided with a primer layer which is an intermediate product of the above-described plastic films and a functional plastic film provided with a functional layer laminated thereon.

The invention further relates to an image display unit which is provided with the plastic film according to the invention.

BACKGROUND ART

In recent years, demand for transparent plastic substrates has been growing as substrates of hard coat films and antireflective films which are to be bonded to plastic articles, surface displays for LCDs and soon, indication screens and touch panels of cellular phones and mobile game machines to thereby impart rubfastness, or to glass products and display surfaces made of glass (CRT, PDP, etc.) to thereby achieve antiscattering, antireflective and stainproof effects.

Among all, there arises a surprising increase in the demand for polyester resin-based films, in particular, biaxially oriented polyethylene terephthalate (PET) films as the substrate films of the functional films as described above because of having excellent mechanical properties, burning resistance, chemical resistance and so on.

In the case of forming functional plastic films with the use of these transparent plastic substrates, it has been a practice to form a functional layer (for example, a hard coat layer) made of an organic compound resin and having a thickness of about several μm to about 50 μm on a substrate either directly or via a highly pressure-sensitive adhesive layer in the form of a thin film. The refractive index (in the facial direction) of a PET film is about 1.65, whereas the refractive index of a hard coat layer made of an organic compound such as an acrylic resin is generally around 1.53 and ranges from 1.50 to 1.56, thereby showing a difference in refractive index of 0.10 or more. As a result, there arise problems such as (1) showing a high reflectance at the interface; (2) interference spots occurring due to the interference of reflection on the interface and reflection on the surface; and (3) interference spots occurring due to the interference of the reflection on the back surface of PET. These three problems (1), (2) and (3) would worsen the visibility of an article such as an image display unit or damage the high-grade impression thereof.

Under a three-wavelength fluorescent lamp having a high ratio of bright line spectrum components, in particular, interference spots are highlighted. Recently, three-wavelength fluorescent lamps have become common for family use and thus the problem of interference spots have become serious. Therefore, use of functional plastic films having PET films as the substrate is severely restricted, otherwise functional films suffering from the problem of interference spots might be put into the market as such. In the field of large-sized flat TV sets provided with PET films as the substrate, interference spots are actually observed in most of antireflective films loaded thereon.

The occurrence of interference spots is caused by extremely subtle unevenness in film thickness of a hardening layer (a hard coat layer, etc.) or a pressure-sensitive adhesive layer of about several μm to about 50 μm formed on a substrate. Methods for overcoming this problem of the uneven film thickness is fundamentally different from the case of, for example, a hard coat layer of a synthetic resin lens wherein use is generally made of a film-forming method with little coating unevenness such as the immersion method or the deposition method. Concerning plastic films and functional plastic films which are usually produced in the form of a roll film of 30 cm or more in width and 10 m or more in length, it is impossible to overcome the problem of the extremely subtle coating unevenness occurring at random by using the existing coating methods.

To prevent these interference spots, attempts have been made to bring the refractive index of a hard coat layer close to the refractive index of a PET film by applying an ionization radiation-hardening resin containing ultrafine particles of a high-refractive index metal oxide on a high-refractive index film such as a PET film and hardening the same to form a hard coat layer, or by applying a siloxane-based thermosetting resin containing ultrafine particles of a high-refractive index metal oxide on a and hardening the same to form a hard coat layer. Although these methods are effective in lessening interference spots, they would bring about other problems such as a decrease in the mechanical strength of the hard coat layer, an increase in haze and, furthermore, a tendency toward an insufficient refractive index of a high-refractive index layer in the case of forming two or more antireflective layers on the surface.

Under these circumstances, there has been reported that interference spots occur in a hard coat film using a substrate made of PET and that these interference spots can be hardly prevented by the existing techniques without inducing serious side effects such as a decrease in mechanical strength or an increase in haze (see, for example, Ikuhiro Kimura, *Hansha-Boshi Maku no Tokusei to Saiteki Sekkei Maku Sakusei Gijutsu*, Gijutsu Joho Kyokai, 2001, pp. 166–171).

Next, the situation will be further described. Although here have been proposed methods of improving the mechanical strength (see, for example, JP-A-7-151902), the problem of haze still remains unsolved. In addition, few of the proposed methods can result in satisfactory improvement in the mechanical strength.

Also, there have been reported some countermeasures for interference spots by introducing scattering (see, for example, JP-A-8-197670 and JP-A-10-282312). Although these methods are effective as countermeasures for interference spots, the refractive index still remains at a high level and there arises an additional problem of haze, which severely restricts the practical use thereof.

Moreover, it has been reported that the occurrence of interference fringes can be prevented by providing, between a hard coat layer and a PET film, a buffer layer (3 to 50 μm) having an intermediate refractive index between the hard coat layer and the PET film (see, for example, JP-A-2000-347003). As the results of our follow-up test, however, only insufficient effects could be achieved on interference spots under the above conditions.

The above-described problem of interference spots occurring in the case of using a high-refractive index substrate typified by a PET film and a usual hard coat layer having a refractive index of about 1.53 also arises in the combination of a low-refractive index substrate typified by triacetylcellulose (TAC) and a high-refractive index hard coat layer. For example, antireflective hard coat films having a high-refractive index hard coat layer and a low-refractive index antireflective layer laminated on a substrate are widely known and there have been also disclosed antireflective hard coat films wherein a high-refractive index hard coat layer is formed on a TAC film and a low-refractive index an antireflective layer made of silicon oxide is further overlaid thereon (see, for example, JP-A-7-287102). It has been reported that interference spots occur even in the latter combination (see, for example, JP-A-2001-318207 (paragraph 0004)) and no effective countermeasure therefor has been proposed so far.

Furthermore, similar interference spots occur in the case where a pressure-sensitive adhesive layer is overlaid on a substrate and the refractive index of the substrate largely differs from the refractive index of the pressure-sensitive adhesive layer. To solve this problem, it has been proposed to elevate the smoothness of a PET film to thereby lessen the interference spots occurring due to the PET film and the pressure-sensitive adhesive (see, for example, JP-A-2001-071439), though only insufficient effects can be achieved on the interference spots thereby.

Moreover, it is frequently observed at present that a substrate film per se is produced in the state of being provided with a primer layer having a refractive index largely different from that of the substrate and thus the substrate film per se suffers from the problem of interference spots as described above, thereby hindering the solution of the problems of interference spots and high refractive index.

DISCLOSURE OF THE INVENTION

Under the above-described circumstances, an object of the invention is to provide a plastic film having a functional layer such as a hard coat layer or a pressure-sensitive adhesive layer formed on a substrate wherein the occurrence of interference spots is prevented. More specifically, the invention aims at providing a hard coat film with lessened interference spots, a plastic film provided with a low-haze pressure-sensitive adhesive layer, and a plastic film provided with a primer layer which is adequate as the substrate of functional plastic films.

Another object of the invention is to provide a functional plastic film with the use of the above-described plastic film as the substrate and having various functions imparted thereto, in particular, an antireflective film having low refractive index, and an image display unit provided with such a plastic film.

The present inventors have conducted extensive studies and, as a result, found out that interference spots can be eliminated without causing any serious problems in performance such as a decrease in mechanical strength or an increase in haze by optimizing the physical properties on a transparent plastic substrate.

More specifically, they have found out that the above-described objects can be achieved in the following manner.

1. A plastic film having, at least on one face of a transparent plastic substrate, a primer layer and a functional layer laminated in this order characterized in that:

a refractive index $n_S$ of the transparent plastic substrate and a refractive index $n_H$ of the functional layer satisfy the following numerical formula (1):

$0.03 \leq |n_S - n_H|$; and an average reflectance of light of from 540 to 550 nm in wavelength incidenting perpendicular onto the film face at the interface between the functional layer and the substrate is 0.02% or less.

2. A plastic film as described in the above 1 characterized in that the average reflectance as described above is 0.01% or less.

3. A plastic film as described in the above 1 characterized in that the average reflectance as described above is 0.005% or less.

4. A plastic film having, at least on one face of a transparent plastic substrate, a primer layer and a functional layer laminated in this order characterized in that:

a refractive index $n_S$ of the transparent plastic substrate and a refractive index $n_H$ of the functional layer satisfy the following numerical formula (1):

$0.03 \leq |n_S - n_H|$; and the primer layer has a refractive index $n_P$ and a film thickness $d_P$ satisfying the following numerical formula (2) and numerical formula (3):

$$\sqrt{n_S \times n_H} - \frac{|n_S - n_H|}{4} \leq n_P \leq \sqrt{n_S \times n_H} + \frac{|n_S - n_H|}{4} \quad (2)$$

$$d_P = (2N - 1) \times \lambda / (4n_P) \quad (3)$$

wherein λ represents a visible light wavelength ranging from 450 nm to 650 nm; while N represents a positive integer.

5. A plastic film as described in the above 4 characterized in that the primer layer has a refractive index $n_P$ satisfying the following numerical formula (7):

$$\sqrt{n_S \times n_H} - \frac{|n_S - n_H|}{8} \leq n_P \leq \sqrt{n_S \times n_H} + \frac{|n_S - n_H|}{8} \quad (7)$$

6. A plastic film as described in the above 4 or 5 characterized in that the primer layer has a film thickness $d_P$ satisfying the following formula:

$d_P = \lambda/(4n_P)$ wherein λ represents a visible light wavelength ranging from 450 nm to 650 nm.

7. A plastic film as described in the above 4 or 5 characterized in that the primer layer has a film thickness $d_P$ satisfying the following formula:

$d_P = \lambda/(4n_P)$ wherein λ represents a visible light wavelength ranging from 500 nm to 600 nm.

8. A plastic film as described in the above 4 or 5 characterized in that the primer layer has a film thickness $d_P$ satisfying the following formula:

$d_P = \lambda/(4n_P)$ wherein λ represents a visible light wavelength ranging from 530 nm to 580 nm.

9. A plastic film as described in any of the above 1 to 8 characterized in that a refractive index $n_S$ of the substrate and a refractive index $n_H$ of the functional layer satisfy the following formula:

$0.06 \leq |n_S - n_H|$.

10. A plastic film as described in any of the above 1 to 8 characterized in that a refractive index $n_S$ of the substrate and a refractive index $n_H$ of the functional layer satisfy the following formula:

$0.10 \leq |n_S - n_H|$.

11. A hard coat film as described in any of the above 1 to 10 characterized in that the functional layer is a hard coat layer.

12. A hard coat film as described in the above 11 characterized in that the hard coat layer is hardened by irradiating activation energy beams.

13. A hard coat film as described in the above 11 or 12 characterized in that the thickness of the hard coat layer is 20 μm or more but not more than 50 μm.

14. A hard coat film as described in any of the above 11 to 13 characterized in that the pencil hardness of the surface in the side having the hard coat layer is 3 H or more.

15. A hard coat film as described in any of the above 11 to 13 characterized in that the pencil hardness of the surface in the side having the hard coat layer is 4 H or more.

16. A hard coat film as described in any of the above 11 to 13 characterized in that the pencil hardness of the surface in the side having the hard coat layer is 5 H or more.

17. A plastic film as described in any of the above 1 to 10 characterized in that the functional layer is a pressure-sensitive adhesive layer.

18. A plastic film as described in any of the above 1 to 17 characterized by having as the functional layers a hard coat layer on one face and a pressure-sensitive adhesive layer on the other face.

19. A plastic film as described in the above 18 characterized in that the primer layer in the side of the hard coat layer and the primer layer in the side of the pressure-sensitive adhesive layer are made of the same composition.

20. A plastic film as described in the above 18 characterized in that the primer layer in the side of the hard coat layer and the primer layer in the side of the pressure-sensitive adhesive layer are made of the same composition and have the same film thickness.

21. A hard coat film as described in any of the above 1 to 16 or 18 to 20 characterized in that the hard coat layer is formed by the continuous coating method on the rolled continuous substrate film.

22. A plastic film provided with a primer layer which has primer layer laminated at least on one face of a transparent plastic substrate having a refractive index $n_S$ characterized by satisfying the following two requirements:

(a) $n_S \geq 1.56$ or $n_S \leq 1.50$; and (b) in the case where a hard coat layer having a difference in refractive index from the transparent plastic substrate of 0.03 or more is formed on the primer layer, an average reflectance of light of from 540 to 550 nm in wavelength incidenting perpendicular onto the film face at the interfaces between the hardening layer and the substrate is 0.02% or less.

23. A plastic film provided with primer layers which has k layers of primer layers having a refractive index $n_{Pi}$ laminated at least on one face of a transparent plastic substrate having a refractive index $n_S$ characterized by satisfying the following two requirements:

(c) $n_S \geq 1.56$ or $n_S \leq 1.50$; and (d) $|n_{P(i-1)} - n_{Pi}| \leq 0.03$ wherein i is an integer of from 1 to k; and k is an integer of 1 or more and represents the total number of the primer layers laminated;

provided that in the case where i−1=0, then $n_{P0}=n_S$, namely, $|n_S - n_{P1}| \leq 0.03$.

24. A plastic film as described in any of the above 1 to 23 characterized in that a refractive index $n_S$ of the substrate is 1.56 or more and less than 1.90.

25. A plastic film as described in the above 24 characterized in that the substrate is a polyester film.

26. A plastic film as described in the above 25 characterized in that the substrate is a polyethylene terephthalate (PET) film.

27. A plastic film as described in the above 24 characterized in that the substrate is a polycarbonate film.

28. A plastic film as described in the above 26 characterized in that a refractive index and a film thickness of the primer layer satisfy the following two requirements:

(e) the refractive index being 1.58 or more but not more than 1.60; and (f) the film thickness being 74 nm or more but not more than 98 nm, or 222 nm or more but not more than 294 nm.

29. A plastic film as described in any of the above 1 to 23 characterized in that a refractive index $n_S$ of the substrate is 1.50 or less.

30. A plastic film as described in the above 29 characterized in that the substrate is a cellulose ester film.

31. A plastic film as described in the above 29 characterized in that the substrate is a triacetylcellulose (TAC) film.

32. A plastic film as described in the above 31 characterized in that a refractive index and a film thickness of the primer layer satisfy the following two requirements:

(e) the refractive index being 1.49 or more but not more than 1.51; and (f) the film thickness being 78 nm or more but not more than 104 nm, or 235 nm or more but not more than 312 nm.

33. A plastic film as described in any of the above 1 to 32 characterized in that the primer layer contains fine particles of a metal oxide.

34. A plastic film as described in the above 33 characterized in that the primer layer contains fine particles of a conductive metal oxide.

35. A plastic film as described in the above 34 characterized in that the fine particles of a conductive metal oxide are fine particles of ATO (antimony-doped tin oxide), PTO (phosphorus-doped tin oxide) or ITO (tin-doped indium oxide).

36. A plastic film as described in any of the above 1 to 35 characterized in that the primer layer is a pressure-sensitive adhesive undercoat layer.

37. A plastic film as described in any of the above 1 to 36 characterized in that plural primer layers are formed at least on one face of the substrate and the total thickness of these primer layers is 1 μm or less.

38. A plastic film as described in any of the above 1 to 37 characterized by having a haze of 2% or less.

39. A plastic film as described in any of the above 1 to 37 characterized by having a haze of 1% or less.

40. A plastic film as described in any of the above 1 to 39 characterized in that the primer layer is formed by the continuous coating method on the rolled continuous substrate film.

41. A plastic film as described in the above 21 or 40 characterized in that the rolled film has a length of 10 m or more.

42. A plastic film as described in the above 21 or 40 characterized in that the rolled film has a length of 100 m or more.

43. A plastic film as described in the above 21 or 40 characterized in that the rolled film has a length of 500 m or more.

44. A plastic film as described in the above 21 or any of 41 to 43 characterized in that the rolled film has a width of 30 cm or more.

45. A plastic film as described in the above 21 or any of 41 to 43 characterized in that the rolled film has a width of 60 cm or more.

46. A plastic film as described in the above 21 or any of 41 to 43 characterized in that the rolled film has a width of 1 m or more.

47. A functional plastic film characterized in that a plastic film as described in any of the above 1 to 46 further has a functional layer other than a hard coat layer and a pressure-sensitive adhesive layer.

48. An antireflective film characterized in that a functional plastic film as described in the above 47 has an antireflective layer as the functional layer as described in the above 47.

49. An antireflective film as described in the above 48 characterized in that the antireflective layer has a surface reflectance of 3% or less.

50. An antireflective film as described in the above 48 characterized in that the antireflective layer has a surface reflectance of 1.5% or less.

51. An image display unit characterized by being provided with a functional plastic film as described in any of the above 1 to 50.

52. An image display unit as described in the above 51 characterized in that the difference (absolute value) between a refractive index of the pressure-sensitive adhesive of the plastic film and a refractive index of the material employed in the pressure-sensitive adhesive face of the image display unit is 0.03 or less.

53. An image display unit as described in the above 51 characterized in that the difference (absolute value) between a refractive index of the pressure-sensitive adhesive of the plastic film and a refractive index of the material employed in the pressure-sensitive adhesive face of the image display unit is 0.02 or less.

54. An image display unit as described in the above 51 characterized in that the difference (absolute value) between a refractive index of the pressure-sensitive adhesive of the plastic film and a refractive index of the material employed in the pressure-sensitive adhesive face of the image display unit is 0.01 or less.

The invention is described in more detail below.

Now, the invention will be described in greater detail.

The plastic film according to the invention is a plastic film wherein the occurrence of interference spots, which are frequently observed under a light source containing bright line spectrum components of specific wavelength particularly in the visible region (for example, a fluorescent lamp), is prevented. More specifically speaking, the plastic film according to the invention includes a hard coat film having a hard coat layer, a plastic film provided with a pressure-sensitive adhesive layer which has a pressure-sensitive adhesive layer, a plastic film provided with a primer layer which is an intermediate product of the above-described plastic films and a functional plastic film provided with a functional layer. Moreover, an antireflective film provided with an antireflective layer also falls within the category of the plastic film according to the invention wherein the occurrence of interference spots is prevented.

The interference spots discussed in the invention occur, for example, in the case of forming, on a substrate film having a high refractive index typified by PET (polyethylene terephthalate), a layer having a large difference in refractive index from the substrate such as a hard coat layer or a pressure-sensitive adhesive layer. In such a case, the reflectance at the interface between the layer and the substrate is elevated and thus interference spots occur due to the interference of reflection on the interface and reflection on the film surface. The interference is affected by extremely subtle unevenness in film thickness of a layer such as a hard coat layer formed on the substrate or the substrate and cause the occurrence of fringes or spots. Although this phenomenon is called interference fringes or Newton's rings in some published patents and documents, fringes or rings are not always observed even though the interference arises in the same mechanism. In the case of forming a particularly thin layer (several µm or less in thickness), interference spots are sometimes observed. Under these circumstances, this phenomenon is called interference spots herein.

The interference spots discussed herein is strongly observed too in the case of using a base film having a low refractive index typified by TAC (triacetylcellulose) in combination with, for example, a hard coat layer having a high refractive index.

As reported in JP-A-7-15902, such interference spots arise when the difference (absolute value) between the refractive index of a layer formed on the substrate and the refractive index of the substrate is 0.03 or more.

In the invention as will be described hereinafter, therefore, the effect of preventing interference spots can be remarkably exhibited in the case where the difference between the refractive index of a hard coat layer or a pressure-sensitive adhesive layer and the refractive index of the substrate is 0.03 or more. A still remarkable effect can be observed at a difference in refractive index of 0.06 or more and a further remarkable effect can be observed at a difference in refractive index of 0.10 or more.

It is well known that the distance allowing the interference of light, i.e., the coherence length (interferable distance) is approximately determined from the wavelength and bandwidth (emission spectrum width) of the light and represented by the following formula (see, for example, J. D. Rancourt, "OPTICAL THIN FILMS USER HANDBOOK" Optical Coating Laboratory, Inc. 11 (1996)).

Coherence length $L=\lambda^2/\Delta\lambda$ ($\Delta\lambda$: bandwidth)

As the above formula indicates, light from a light source containing a spectrum with a narrow bandwidth $\Delta\lambda$ has a long coherence length and thus interference spots are frequently observed in this case. Thus, it can be understood that interference spots are observed under a fluorescent lamp containing a bright line spectrum with a narrow bandwidth originating in the light emission by mercury atoms due to discharge and, in particular, interference spots are highlighted under a light source, for example, a three-wavelength fluorescent lamp having a high ratio of emission spectrum components with narrow bandwidth.

In the case of considering the interference of reflection on the interface between a hard coat layer formed as a functional layer and the substrate and the reflection on the hard coat layer surface, interference is liable to arise when the film thickness of the hard coat layer is shorter than the coherence length. Namely, it can be understood that interference spots are strongly observed in a hard coat film having a relatively thin hard coat layer of about 5 µm in film thickness. Under a three-wavelength fluorescent lamp containing a bright line spectrum of an extremely narrow bandwidth (for example, 546.074 nm) due to the light emission by mercury atoms, however, interference spots are highlighted as described above and thus interference spots are observed even in the case of using a thick hard coat layer of about 50 µm.

In order to eliminate interference spots, therefore, it is proposed that the film thickness of the hard coat layer is enlarged to 20 µm or more so as to weaken the interference spots and then the reflectances of the hard coat layer and the substrate are lowered to lessen the reflection per se, thereby completely getting off the interference spots.

To completely solve the problem of interference spots, the reflectance at the interface between the functional layer and the substrate is lowered so as to lessen (preferably eliminate) the reflection from the interface, thereby preventing the interference with the reflection from the functional layer surface. This method is effective on a functional layer causing interference spots, in particular, a layer the refractive index of which affecting the reflectance is not taken into consideration usually (for example, a hard coat layer or a pressure-sensitive adhesive layer). Namely, the problem of interference spots can be overcome by lowering the reflectance from the interface between the functional layer and the substrate.

In the plastic film according to the invention, a primer layer is formed on a transparent plastic substrate and the optical properties such as the refractive index and the reflectance are optimized. Thus, the reflectance at the interface is lowered so as to prevent the occurrence of interference spots.

To illustrate more specifically, a hard coat film having a primer layer P and a hard coat layer laminated at least on one face of a transparent plastic substrate in this order will be taken by way of example. This plastic film should satisfy the following two requirement.

1) The refractive index $n_S$ of the transparent plastic substrate and the refractive index $n_H$ of the functional layer satisfy the following numerical formula (1):

$$0.03 \leq |n_S - n_H| \tag{1}$$

2) The average reflectance of light of from 540 to 550 nm in wavelength incidenting perpendicular onto the film face at the interfaces between the hard coat layer and the substrate is 0.02% or less.

Concerning a plastic film having a layer other than a hard coat layer (for example, a plastic film provided with a pressure-sensitive adhesive layer wherein a primer layer Q and a pressure-sensitive adhesive layer are laminated in this order at least on face of a transparent plastic substrate), it is also sufficient that the above requirements (requirements about the difference in refractive index from the substrate and the reflectance at the interface) are satisfied.

The reflectance at the interface between the hard coat layer and the substrate as described above can be calculated from the refractive indexes of the hard coat layer and the substrate. In the invention, a primer layer is located at the interface. The reflectance at the interface is represented by $I_R/I_O$ (wherein $I_O$ stands for the intensity of light incidenting perpendicular to the substrate; and $I_R$ stands for the sum of the reflections involving multi-reflection at the interface between the substrate and the first primer layer, the interface between the first primer layer and the second primer layer, - - - the interface between the (n−1) primer layer and the n primer layer and the interface between the n primer layer and the hard coat layer. That is to say, $I_R$ means the grand total considering the reflection phase at each interface. The reflectance at the interface can be calculated using the refractive indexes of the transparent plastic substrate and the hard coat layer and the film thickness and refractive index of the plastic film. The average reflectance at wavelength of from 540 to 550 nm may be determined by calculating the reflectance at intervals of 1 nm and averaging the obtained values.

It is also possible to measure the reflectance at the interface. For example, it can be estimated by forming a uniform hardening layer having a refractive index of 1.53 and a dry film thickness of several μm on a substrate an measuring the amplitude of oscillation (also called fringes or ripples) observed on the mirror plane reflective spectrum. When the film thickness is irregular in this case, there arises a phase difference in the area for measuring the reflective spectrum, which brings about an estimation error. It is therefore important to form a uniform hardening layer. When the bandwidth of the light source for measuring the reflective spectrum is broader, the oscillation amplitude becomes narrower too. In this case, however, exact estimation can be made by calculating while taking the light source shape (resolution) into consideration.

The reflectance at the interface between the pressure-sensitive adhesive layer and the substrate may be measured as follows. In the case where the refractive index of the pressure-sensitive adhesive layer is closed to the refractive index of glass, for example, use may be made of a one-side antireflective glass plate having an antireflective layer overlaid on one face. A transparent plastic film provided with a pressure-sensitive adhesive layer is subjected to an antireflective treatment in the back face by rubbing with a sandpaper sheet in the side having no pressure-sensitive adhesive layer and then painting with a black marker. Then the antireflective layer of the one-side antireflective glass plate is bonded to the side having no antireflective layer of the transparent plastic film provided with a pressure-sensitive adhesive layer. Thus, the reflectance can be determined by measuring the mirror plane reflective spectrum from the side having the antireflective layer of the glass plate. Utilization of an acrylic pressure-sensitive adhesive commonly employed in the art corresponds to this case. In this case, the measurement accuracy is elevated with a decrease in the reflectance of the low-reflectance glass plate. It is favorable that the low-reflectance glass plate provided with an antireflective layer to be employed herein has an average mirror plane reflectance of 0.50% or less.

When the refractive index of the pressure-sensitive adhesive layer is largely different from that of glass, a one-side antireflective plate is formed by using a transparent substrate having an refractive index close to that of the pressure-sensitive adhesive layer and then the reflectance is measured as described above. Thus, the reflectance can be determined.

Next, the plastic film according to the invention will be described in greater detail.

The substrate to be used in the invention is a transparent plastic film substrate preferably in the form of a film, a sheet or a plate. The term "film" as used herein involves not only filmy substrates but also sheet-type and plate-type substrates.

The refractive indexes of a hard coat layer and the pressure-sensitive adhesive layer are usually around 1.53. It is therefore favorable in the invention to employ a substrate having a high refractive index (1.56 or more). In this case, the refractive index of the substrate is preferably 1.56 or more but less than 1.90, still preferably 1.60 or more but less than 1.70. It is preferable to employ a plastic film made of a polymer having a high refractive index. Examples of the polymer having a high refractive index include polycarbonate, polyesters (for example, polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polysulfone, polyarylate and polystyrenes (for example, syndiotactic polystyrene). Among all, polycarbonate and polyethylene terephthalate are preferable therefor.

In the case of using a low refractive index hard coat layer having a refractive index lower than the usual level, it is also preferable to use the high refractive index substrate as described above. In such a case, the refractive index difference is enlarged compared with the above cases.

In the case of using a high refractive index hard coat layer having a refractive index higher than the usual level, use may be made of a substrate having a low refractive index (1.50 or less). As such a substrate, a plastic film made of a polymer having a low refractive index is preferable. Examples of the polymer having a low refractive index include cellulose esters (cellulose acetates (for example, triacetylcellulose, cellulose acetate butyrate), cellulose tributyrate), PMMA (polymethyl methacrylate), PP (polypropylene), fluororesin films of FEP (tetrafluoroethylene-hexafluoropropylene polymer) and so on. Among all, triacetyl cellulose is preferable therefor.

The term "transparent" as used with respect to the transparent substrate means having a light transmission of 80% or more, preferably 86% or more, in the visible light region. In the case of using a plastic film provided with a pressure-sensitive adhesive layer as a sticker, a printing layer is provided between a primer layer and a pressure-sensitive adhesive layer and thus the light transmission may be lower than 80% in some parts.

From the viewpoint of the visibility of the plastic film, it is preferable that the haze of the plastic film is 3.0% or less, preferably 2.0% or less and particularly preferably 1.0% or less. The haze of the transparent plastic substrate per se is preferably 50% or less, still preferably 25% or less and particularly preferably 10% or less. In the case where linear transmitted light is regarded as principally important and thus a lower haze is required, it is preferable that the haze is 3.0% or less, still preferably 2.0% or less and particularly preferably 0%.

Although the lower limit of the haze is preferably 0%, it is reasonably set to 0.01% from the viewpoint of measurement and the like.

In the case where the substrate is a film, the substrate thickness is preferably from 20 to 300 μm, still preferably from 80 to 200 μm. When the base film is too thin, the film strength is worsened. When the base film is too thick, on the other hand, the rigidity is excessively elevated. In the case where the substrate is a sheet, the substrate thickness may be at such a level as is not damaging the transparency. Namely, use may be made of a substrate having a thickness of from 300 μm to several mm.

In the case where the substrate thickness is 1 mm or less, in particular, 300 μm or less, interference spots are sometimes observed due to the interference of the reflections on the front face and back face of the substrate under a light source containing bright line components in the visible region such as a three-wavelength fluorescent lamp. In the invention, these interference spots on the front and back faces of the substrate can be lessened by forming primer layers on both faces. A synthetic resin lens generally has a large thickness and thus no interference spot arises due to the reflections on the front and back face. This is a fundamental difference between a synthetic resin lens and a film.

In the invention, antireflective primer layers (primer layer P and primer layer Q) are formed at the interfaces between the functional layers such as hard coat layers or pressure-sensitive adhesive layers and the substrate as described above. Thus, the reflectances at the interfaces are largely lowered so as to almost eliminate interference spots.

In the hard coat film according to the invention, the effect of the primer layer P is exhibited when the difference between the refractive index $n_S$ of the substrate and the refractive index $n_H$ of the hard coat layer is 0.03 or more and thus interference spots occur. An obvious effect is observed at a difference between the refractive indexes of 0.06 or more and a still obvious effect is observed at a difference between the refractive indexes of 0.10 or more.

When the refractive index $n_P$ of the primer layer P satisfies the following numerical formula (2) and the film thickness $d_P$ is adjusted to a specific level (the numerical formula (3)), the reflectance at the interface between the hard coat layer and the substrate can be largely lowered and thus the occurrence of interference spots can be prevented.

$$\sqrt{n_S \times n_H} - \frac{|n_S - n_H|}{4} \leq n_P \leq \sqrt{n_S \times n_H} + \frac{|n_S - n_H|}{4} \quad (2)$$

To further lower the reflectance at the interface between the hard coat layer and the substrate, it is preferable that the refractive index $n_P$ satisfies the following numerical formula (7).

$$\sqrt{n_S \times n_H} - \frac{|n_S - n_H|}{8} \leq n_P \leq \sqrt{n_S \times n_H} + \frac{|n_S - n_H|}{8} \quad (7)$$

It is highly preferable that the refractive index $n_P$ satisfies the following numerical formula (9), since the reflectance concerning the line spectrum at specific wavelength can be theoretically zeroed out thereby together with the control of the film thickness $d_P$ of the primer layer.

$$n_P = \sqrt{n_S \times n_A} \quad (9)$$

The film thickness $d_P$ of the primer layer P should satisfy the following numerical formula (3).

$$d_P = (2N-1) \times \lambda/(4n_P) \quad \text{Numerical formula (3):}$$

wherein λ represents a visible light wavelength ranging from 450 nm to 650 nm; while N represents a positive integer.

Now, the numerical formulae will be roughly illustrated. The numerical formula (9) and the numerical formula (3) are generally presented in texts of optics (see, for example, J. D. Rancourt, "OPTICAL THIN FILMS USER HANDBOOK", Optical Coating Laboratory, Inc. 9(1996)). When the refractive index $n_P$ and the film thickness $d_P$ satisfy both of these formulae, the reflectance is theoretically zeroed. Even in the case where these factors are at some what variance with the numerical formula (9) and the numerical formula (3), the reflectance is extremely low and thus scarcely any interference spots are noticeable in practice. In the invention, the tolerance level of the variance is found out. More specifically speaking, the numerical formula (2) and the numerical formula (7) widens the meaning of the numerical formula (9) and thus specify a tolerance margin.

The numerical formula (7) is adjusted to give a tolerance margin equivalent to the reflectance at the interface showing no interference spot, i.e., $|n_S - n_H| = 0.03$ in the case where a primer layer P and a hard coat layer having a refractive index of 1.53 are overlaid on a PET film having a refractive index of 1.65.

Under the above-described conditions, a lower film thickness $d_P$ of the primer layer is preferable since the higher antireflective effect can be achieved thereby. A lower $d_P$ is also favorable from the viewpoint of mechanical strength. For these two reasons, it is preferable that $N \leq 2$ ($d_P = \lambda/(4n_P)$ or $d_P = 3\lambda/(4n_P)$), still preferably $N=1$ ($d_P = \lambda/(4n_P)$).

Considering the facts that human visibility is sensitive to green color (a visibility peak being at 550 nm: JIS-R-3106) and that the bright line components of a three-wavelength fluorescent light get centered around 545 nm, it is preferable that λ is a value falling within the range of from 500 nm to 600 nm, still preferably from 530 nm to 580 nm.

It is also preferable to design the film thickness giving λ=546 nm by sighting on the bright line of 546.074 nm (green) among the emission spectra of a fluorescent lamp. In this case, the average reflectance at the interface to the whole visible light region is lowered to about 10% and the reflectance based on the weighted average visibility is lowered to about 1.5% compared with the case using no primer layer, thereby showing a sufficient antireflective effect on visible light.

The invention is not restricted to hard coat films to be used under fluorescent lamps including a three-wavelength fluorescent lamp. Namely, it is applicable to any light source so long as it contains bright line components in the visible light region. In the case of a hard coat film to be used exclusively under a sodium lamp as a light source in the using environment, for example, the film thickness may be designed to give λ=589 nm.

As a specific example satisfying the above numerical formula, it is preferable to use a primer layer having the following refractive index and film thickness in the case where a PET substrate is employed and the refractive index of the hard coat layer is about 1.53.

(e) The refractive index is 1.58 or more but not more than 1.60.

(f) The film thickness is 74 nm or more but not more than 98 nm, or 222 nm or more but not more than 294 nm.

In the case where a TAC substrate having a lower refractive index than that of a hard coat layer is employed and the refractive index of the hard coat layer is about 1.53, it is preferable to use a primer layer having the following refractive index and film thickness.

(g) The refractive index is 1.49 or more but not more than 1.51.

(h) The film thickness is 78 nm or more but not more than 104 nm, or 235 nm or more but not more than 312 nm.

When the hard coat film is to be bonded to, for example, an image display unit, it has been a practice that a pressure-sensitive adhesive layer is formed on the face of the substrate in the opposite side to the hard coat and then the film is bonded via the pressure-sensitive adhesive layer.

In this case, it is preferable to lower the refractive index at the interface between the pressure-sensitive adhesive layer and the substrate by providing a primer layer Q having a specific refractive index $n_Q$ and a film thickness $d_Q$ having the same relation to the refractive index $n_A$ of the pressure-sensitive adhesive layer and the refractive index $n_S$ of the substrate as the primer layer P as described above.

In the case where the substrate has no hard coat layer or the difference between the refractive index of the hard coat layer and the refractive index of the substrate is 0.03 or less, there arises the same problem between the substrate and the pressure-sensitive adhesive layer regardless of the presence/absence of the hard coat layer. As discussed above, when the difference between the refractive index of the hard coat layer and the refractive index of the substrate is 0.03 or more, a high reflectance is achieved at the interface between the pressure-sensitive adhesive layer and the substrate thereby causing the occurrence of interference spots.

The plastic film provided with a pressure-sensitive adhesive layer according to the invention is a film wherein a primer layer Q similar to the primer layer P formed on the hard coat film is provided so as to control the reflectance between the pressure-sensitive adhesive layer and the substrate and thus lessen interference spots.

In general, there are various pressure-sensitive adhesives having refractive index of about 1.40 to 1.70. In bonding such a transparent film as the plastic film according to the invention, use is mainly made of acrylic materials having refractive index of from 1.50 to 1.55. However, the reflectance of the hard coat and the pressure-sensitive adhesive can be controlled and the reflectance at the interface between the pressure-sensitive adhesive and the adherend can be minimized without restricted to the above-described refractive index range by adjusting the refractive index $n_A$ of the pressure-sensitive adhesive to the refractive index (referred to as $n_M$) of the surface material of the adherend (for example, an image display unit). In recent years, there have been developed various pressure-sensitive adhesives or adhesives (see, for example, Fumio Ide et al., Kogaku-yo Tomei Jushi, Gijutsu Joho Kyokai, 177–180 (2001)). When combined with these pressure-sensitive adhesives, the application is applicable over an extremely large scope.

The difference ($|n_A-n_M|$) between the refractive index of the pressure-sensitive adhesive layer formed in the plastic film according to the invention and the refractive index of the surface material of the subject satisfies the following formula: $|n_A-n_M|\leq 0.03$, still preferably $|n_A-n_M|\leq 0.02$ and particularly preferably $|n_A-n_M|\leq 0.01$. Similar to the case of $|n_S-n_H|$ as described above, the reflectance at the interface between the substrate and the pressure-sensitive adhesive layer is elevated with an increase in $|n_S-n_A|$. Namely, the effect of the invention is enhanced as $|n_S-n_A|$ increases. Therefore, it is preferable that $|n_S-n_A|$ satisfies the formula $|n_S-n_A|\geq 0.03$, still preferably $|n_S-n_A|\geq 0.06$ and particularly preferably $|n_S-n_A|\geq 0.10$.

In the case of forming a primer layer P in one side of a single substrate and another primer layer Q in the other side, the primer layers P and Q may be made of different compositions depending on the purpose. In the case where the refractive index of the hard coat layer should be different from the refractive index of the pressure-sensitive adhesive for the above-described reason, each composition may be designed depending on the refractive index required. From the viewpoint of productivity, on the other hand, it is a preferable embodiment that both of these layers are made of the same composition. One of the characteristics of the invention resides in that the front and back primer layers P and Q may be made of original compositions respectively. In the case of a synthetic resin lens, for example, the primer layers and hard coat layers in the front and back faces should have the completely same qualities. Thus, these layers are usually formed by the immersion method so that they have the same composition and film thickness. This point is the crucial difference between the hard coat film according to the invention and synthetic resin lenses.

In the case of using a polyester film as the substrate, the polyester film shows high surface aggregation due to crystal orientation and thus poor adhesiveness to various materials. In order to enhance the adhesiveness of the polyester film to the hard coat layer, the polyester film may be surface-treated by the oxidization method or the concavo-convex method in one or both faces. The oxidization method as described above is exemplified by corona discharge, glow discharge, chromic acid treatment (wet), flaming, hot-air treatment, ozone/UV light irradiation, etc.

It is also possible to provide the primer layer as an undercoat layer of the substrate. Examples of the material to be used in the undercoat layer include copolymers or latexes made of vinyl chloride, vinylidene chloride, butadiene, (meth)acrylic acid esters, vinyl esters and the like, and water-soluble polymers such as low molecular weight polyester and gelatin. The undercoat layer may further contain an antistatic agent, for example, a metal oxide such as tin oxide, complex oxides of tin oxide-antimony oxide or complex oxides of tin oxide-indium oxide or a quaternary ammonium salt.

To improve the adhesiveness between the substrate and the hard coat layer, it is also possible to make the primer layer highly adhesive so as to impart a function as an adhesive undercoat layer thereto. To make it highly adhesive, a highly adhesive coating may be applied to form the primer layer.

For primer layers, there are organic-solvent based coating solutions and water-based ones. In the invention, use may be made of either type. From the viewpoints of environmental safety (hazard caused by volatilization), sanitation and resource saving, it is preferable to use a water-based one.

Examples of the water-based highly adhesive coating include water-soluble or water-dispersible polyurethane and copolymerized polyurethane resins which are usable in forming a primer layer. It is also possible to form a primer layer by crosslinking an acrylic resin described in JP-A-1-108037 with an acrylic denatured polyester resin. It is also possible to form a primer layer by using a styrene-butadiene resin or an acrylonitrile-butadiene resin described in JP-B-3-22899 with a specific polyester resin. Moreover, it is possible to employ a styrene-butadiene copolymer or acryl-denatured polyester resin described in JP-A-10-166517.

In the invention, the refractive index of the antireflective primer layer can be controlled by adding fine particles of a metal oxide to a resin.

Examples of the fine particles of a metal oxide include particles having an average particle diameter of 100 nm or less, preferably 50 nm or less, being made of titanium dioxide (for example, rutile, rutile/antatase mixed crystals, anatase, amorphous structure), tin oxide, indium oxide, zinc oxide, zirconium oxide and aluminum oxide, and having a refractive index of 1.6 or more. It is favorable to use titanium dioxide since it has a high refractive index and can contribute to the control of the refractive index of the primer layer at a low addition level.

In the case where a primer layer is formed by using an organic solvent system, it is preferable to treat the surface of the fine inorganic particles with a surface modifier containing an organic segment so as to elevate the affinity of the fine inorganic particles with organic components. As the surface modifier, it is preferable to use one having a functional group, which can form a bond together with the fine inorganic particles or which can be adsorbed by the fine inorganic particles, and a high affinity with a hardening resin which hardens upon irradiation with an active energy beam.

As the surface modifier having a functional group which can be bonded to or adsorbed by the fine inorganic particles, it is preferable to use those having metal alkoxide hardening resins of silane, aluminum, titanium, zirconium and so on and anionic groups such as phosphate, sulfate, sulfonate and carboxylate groups. Although the functional group having a high affinity with organic components may be one merely having an organic component with a hydrophilic/hydrophobic nature, it is preferable to use a functional group capable of chemically binding to an organic component, still preferably an ethylenically unsaturated group.

Examples of a particularly preferable surface modifier for the fine metal oxide particles to be used in the invention include hardening resins having a metal alkoxide or an anionic group together with an ethylenically unsaturated group in a single molecule and acrylic acid copolymers having an anionic group such as a carboxylate.

As typical examples of these surface modifiers, citation may be made of the following unsaturated double bond-containing coupling agents, phosphate-containing organic hardening resins, sulfate-containing organic hardening resins, carboxylate-containing organic hardening resins and so on.

| | |
|---|---|
| $H_2C=C(X)COOC_3H_6Si(OCH_3)_3$ | S-1 |
| $H_2C=C(X)COOC_2H_4OTi(OC_2H_5)_3$ | S-2 |
| $H_2C=C(X)COOC_2H_4OCOC_5H_{10}OPO(OH)_2$ | S-3 |
| $(H_2C=C(X)COOC_2H_4OCOC_5H_{10}O)_2POOH$ | S-4 |
| $H_2C=C(X)COOC_2H_4OSO_3H$ | S-5 |
| $H_2C=C(X)COO(C_5H_{10}COO)_2H$ | S-6 |
| $H_2C=C(X)COOC_5H_{10}COOH$ | S-7 |

(wherein X represents H or $CH_3$.)

It is preferable that these fine inorganic particles are surface-modified in a solution. The fine inorganic particles may be mechanically micro-dispersed in the presence of the surface modifier. Alternatively, the surface modifier may be added after micro-dispersing the fine inorganic particles followed by stirring. It is also possible to employ a procedure wherein the fine inorganic particles are preliminarily surface-modified (optionally followed by heating, drying and heating or pH adjustment) and then micro-dispersed.

To prepare the solution in which the surface modifier is dissolved, it is preferable to use an organic solvent having a high polarity. Specific examples thereof include publicly known solvents such as alcohols, ketones and esters.

In a preferred embodiment of the invention, use is made of, as the fine metal oxide particles, ATO (antimony-doped tin oxide), PTO (phosphorus-doped tin oxide) or ITO (tin-doped indium oxide) so as to impart electric conductivity and antistatic effect at the same time. Examples of organic solvent-based transparent conductive coatings containing these fine conductive metal oxide particles are reported by Michiro Komatsu, *Hanshaboshimaku no Tokusei to Saiteki Sekkei, Maku Sekkei Gijutsu*, Gijutu Joho Kyokai, 37–39 (2001). In the invention, primer layers can be formed by using these coatings. It is also possible to employ the techniques described in JP-A-11-84573, Paragraphs 0040 to 0051.

In another method of forming a primer layer having a high refractive index, use is made of a polymer having a high refractive index as a binder. Needless to say, it is possible to use a combination of a binder having a refractive index with fine particles having a high refractive index. As the polymer having a high refractive index to be used as the binder in the primer layer, it is preferable to employ a polymer having a cyclic group or a polymer containing a halogen atom other than fluorine. A polymer having a cyclic group is preferred to a polymer containing a halogen atom other than fluorine. Use may be also made of a polymer having both of a cyclic group and a halogen atom other than fluorine. Examples of the cyclic group include aromatic groups, heterocyclic groups and alicyclic groups. In particular, aromatic cyclic groups are preferable. As the halogen atom other than fluorine, a chlorine atom is preferable.

Examples of the polymer having a high refractive index include polybis(4-methacryloylthiophenoxy) sulfide, polyvinylphenyl sulfide, poly-4-methacryloyloxyphenyl-4'-methoxyphenyl thioether, polystyrene, styrene copolymers, polycarbonate, melamine resins, phenol resins, epoxy resins, polyurethane obtained by reacting a cyclic (alicyclic or aromatic) isocyanate with a polyol, polythiourethane obtained by reacting xylylene diisocyanate with benzenediol, polythiourethane obtained by reacting trithioisocyanate with trimercaptobenzene, and polyphenylene sulfide obtained by reacting sodium sulfide, dichlorobenzene and dichloro-quarter-phenyl. Among all, aromatic group-containing sulfide type polymers and aromatic group-containing thiourethane type polymers are preferable. It is preferable to use such a polymer latex in the coating solution for primer layer. The average particle diameter of the polymer particles in the latex preferably ranges from 0.01 to 1 μm, still preferably from 0.02 to 0.5 μm. In addition to the polymer latex, the coating solution for primer layer may contain colloidal silica or a surfactant.

From the viewpoint of productivity, it is preferable that the primer layer has a monolayer structure. However, it may be composed of two or more layers, if necessary.

In the case where no such an antireflective primer layer as described above can be established by forming a single layer, two or more materials having different refractive indexes may be alternately overlaid to form two or more layers, thereby providing layers equivalent in effect to the antireflective primer layer of a monolayer structure as described above.

The object of the invention of lowering the reflectance at the interface to thereby prevent the occurrence of interference spots can be also achieved by using an antireflective layer in the inherent meaning, i.e., one having a multilayer structure composed of three layers of λ/4-λ/2-λ/4, in addition to the above-described multilayer film equivalent to the monolayer film. In this case, however, the productivity is somewhat lowered.

In the case of forming two or more primer layers (i.e., overlaying k primer layers having a refractive index $n_{Pi}$ at least on one face of the transparent plastic substrate having a refractive index $n_S$), it is favorable from the viewpoint of preventing reflection at each interface that primer layers adjacent to each other satisfy the following formula:

$$|n_{P(i-1)} - n_{Pi}| \leq 0.03$$

wherein i is an integer of 1 to k; and k is an integer representing the total number of the primer layers laminated.

In the case where i−1=0, then $n_{P0}=n_S$, namely, $|n_S - n_{P1}| \leq 0.03$.

The k-th primer layer comes into contact with the hard coat layer or the pressure-sensitive adhesive layer. Therefore, it preferably satisfies the following formula form a similar point of view.

$$|n_H - n_{Pk}| \leq 0.03 \text{ or } |n_A - n_{Pk}| \leq 0.03.$$

It is still preferable that the right side (i.e., the absolute difference) of each of the above formulae is 0.02 or less, particularly preferably 0.01 or less. When the layers constituting the multilayer structure have each a large film thickness in this case, the films are liable to be firmly adhered to each other and there arises a risk of lowering the light transmission. Therefore, the film thickness is preferably 1 μm or less, still preferably 0.5 μm or less.

It is possible to provide an overcoat layer having the same refractive index as that of the hard coat layer between the primer layer and the hard coat layer. It is also possible to provide an undercoat layer having the same refractive index as that of the substrate between the primer layer and the substrate. It is also possible to provide an overcoat layer having the same refractive index as that of the pressure-sensitive adhesive layer between the primer layer and the pressure-sensitive adhesive layer. Moreover, it is possible to provide an undercoat layer having the same refractive index as that of the substrate between the primer layer and the substrate. When the overcoat layer or the undercoat layer has a large film thickness in these cases, the films are liable to be firmly adhered to each other and there arises a risk of lowering the light transmission. Therefore, the film thickness is preferably 1 μm or less, still preferably 0.5 μm or less.

As a device for applying the coating solution for primer layer to the transparent substrate, use may be made of publicly known coating devices such as a reverse coater, a gravure coater, a rod coater, an air doctor coater and so on reported by Yuji. Ozaki, *Kotingu Hoshiki*, Shin-Shoten, October 1979. From the viewpoint of productivity, it is particularly preferable to employ a coating device which is applicable to a continuous plastic film in roll-to-roll. In this case, the roll length is preferably 10 m or more, still preferably 100 m or more and particularly preferably 500 m or more. The roll width is preferably 30 cm or more, still preferably 60 cm or more and particularly preferably 1 m or more. By considering the degree of freedom in formulation, it is preferable to employ a device whereby primer layers can be independently formed on the front and back faces.

The antireflective primer layer according to the invention is particularly effective in the case where the refractive index of the substrate is higher than the refractive index of the hard coat layer. As a matter of course, however, it is also effective in the case where the refractive index of the substrate is lower than the refractive index of the hard coat layer. The same applies to the primer layer located between the pressure-sensitive adhesive layer and the substrate. That is to say, it is effective either the refractive index of the pressure-sensitive adhesive layer is higher or lower than the refractive index of the substrate.

The hard coat film according to the invention means a film showing a surface hardness of H or more in the pencil hardness test as will be described hereinafter. The hard coat layer is a layer for achieving this pencil hardness. In the hard coat film, it is preferable that the pencil hardness of the surface in the hard coat side is adjusted to 3 H or more, still preferably 4 H or more and particularly preferably 5 H or more, by forming the hard coat layer.

In the invention, the hard coat layer may be formed by an arbitrary method. Form the viewpoint of productivity, it is preferable a hardening composition which hardens upon irradiation with an active energy beam is applied to form a hard coat layer made of the hardening resin which hardens upon the irradiating with the active energy beam.

In the case where a substrate film having a high refractive index is employed, it is preferable to use a resin constituting the hard coat layer which has a refractive index of from 1.45 to 1.6, still preferably from 1.50 to 1.55.

As the hardening resin which hardens upon irradiation with an active energy beam, it is preferable to use a hardening resin having two or more acryl groups in a molecule. Specific examples thereof include polyol polyacrylates such as ethylene glycol diacrylate, 1,6-hexanediol diacrylate, bisphenol A diacrylate, trimethylolpropane triacrylate, ditrimethylolpropane tetraacrylate, pentaerythritol triacrylate, pentaerythritol tetraacrylate, dipentaerythritol pentaacrylate and dipentaerythritol hexaacrylate, polyfunctional urethane acrylates obtained by reacting a polyisocyanate hardening resin with a hydroxyl group-containing acrylate such as hydroxyethyl acrylate, and polyfunctional epoxy acrylates obtained by reacting a polyepoxy hardening resin with a hydroxyl group-containing acryalte (methacrylate). Also, polymers having an ethylenically unsaturated group in a side chain can be used.

In the invention, the hard coat layer is hardened by using radioactive rays, gamma rays, alpha rays, electron beams, ultraviolet rays and so on as the active energy beam. Among all, it is particularly preferable to employ a method wherein a polymerization initiator generating radical using ultraviolet rays is added and then the hard coat layer is hardened by ultraviolet rays.

Either a single polymerization initiator or a combination of plural initiators may be used. It is preferable to add the polymerization initiator in an amount of from 0.1 to 15% by mass, still preferably from 1 to 10% by mass, based on the total mass of the ethylenically unsaturated group-containing hardening resin and the ring opening polymerizable group-containing hardening resin contained in the hardening composition.

In some cases, the hard coat is formed by using a material having a low refractive index.

For example, there has been widely known a method wherein fine inorganic filler particles of silica are added to an organic binder compound so as to elevate the hardness of a hard coat. However, the silica filler has a low refractive index of 1.46 and thus the hard coat layer containing it also shows a low refractive index (about 1.48 to 1.51).

An example of a hard coat compositions having low refractive index (refractive index 1.49) in which ultrafine particles of colloidal silica are dispersed in an UV-hardening organic compound is reported (Takashi Ukada, Purasutikku Hado Koto-Zai, CMC, 71–77 (2000)). It is also possible to use such a hard coat with a low refractive index.

In some cases, the hard coat layer is formed by using a material having a high refractive index.

For example, there has been widely known a method wherein fine inorganic filler particles of alumina, titanium oxide, zirconia, etc. are added to an organic binder compound so as to elevate the hardness of a hard coat. The these fine inorganic filler particles have high refractive indexes of 1.6 to 2.7 and thus the hard coat layers containing them also show high low refractive indexes (about 1.55 to 1.7).

No strong interference spot is usually observed due to a small difference in refractive indexes in a hard coat film in which a hard coat layer made of an organic compound alone is overlaid on a TAC film. In case of overlaying a hard coat layer containing the fine inorganic filler particles as described above in order to elevate the hardness, the difference in refractive indexes is enlarged and thus strong interference spots arise. In such a case, the interference spots can be lessened by using the primer layer according to the invention.

As examples of a composition for forming the hard coat layer having a high refractive index as described above, Japanese Patent No. 1815116 discloses coating compositions comprising polyfunctional acrylic acid ester monomers as the hard coat layer resin-forming component together with powdery inorganic fillers such as alumina and titanium oxide. Moreover, Japanese Patent No. 1416240 discloses a photopolymerizable composition containing an inorganic filling material made of alumina.

It is also widely known to impart antistatic properties to a hard coat layer by adding a conductive material. Conductivity can be imparted by using fine metal oxide particles of ATO (antimony-doped tin oxide), PTO (phosphorus-doped tin oxide) or ITO (tin-doped indium oxide). Since these fine particles of conductive metal oxides have high refractive indexes, there also arises above-described problem. Examples of organic solvent-type transparent conductive coatings are cited in Michiro Komatsu, *Hanshaboshimaku no Tokusei to Saiteki Sekkei, Maku Sekkei Gijutsu*, Gijutu Joho Kyokai, 37–39 (2001).

Although some cases with a need for hard coat layers having high refractive indexes have been discussed above by reference to examples, it is to be understood that the invention is not restricted thereto. In the case where a hard coat layer having a high refractive index is needed for another purpose and thus there arises a difference between the refractive index of the hard coat layer and the refractive index of the substrate, the problem of interference spots becomes obvious. The plastic film according to the invention is efficacious in such a case.

Alternatively, a hard coat layer having a high refractive index can be formed by using a polymer having a high refractive index. As the polymer having a high refractive index, a polymer having a cyclic group or a polymer containing a halogen atom other than fluorine may be cited. Use may be also made of a polymer having both of a cyclic group and a halogen atom other than fluorine. Examples of the cyclic group include aromatic groups, heterocyclic groups and alicyclic groups.

Although the film thickness of the hard coat layer is not particularly restricted, interference spots become thinner due to the above-described relation to the coherence length at a film thickness exceeding 10 μm. At a film thickness of 20 μm or more, interference spots can be easily eliminated by combining with the primer layer according to the invention. From this point of view, the film thickness of the hard coat is preferably 10 μm or more, still preferably 20 μm or more and particularly preferably 30 μm or more. Although the interference spots become thinner with an increase in the thickness, the film can be hardly bended and cracking due to bending frequently occurs thereby. Accordingly, it is preferable that the film thickness is not more than 60 μm, still preferably not more than 50 μm.

It is preferable that the hard coat layer has a thickness of from 10 to 60 μm, still preferably from 20 to 50 μm and particularly preferably from 30 to 50 μm. Although the hard coat layer has a monolayer structure, two or more layers may be formed.

The hard coat layer according to the invention can be formed by applying an active energy beam-hardening coating solution on a transparent substrate by a publicly known film-forming method such as the dipping method, the spinner method, the spray method, the roll coater method, the gravure method, the wire bar method, the slot extrusion coater method (monolayer, multilayer) or the slide coater method, and then drying it followed by hardening by irradiating with an active energy beam.

It is preferable to carry out the drying under such conditions that an organic solvent concentration in the applied liquid film is controlled to 5% by mass or less, still preferably 2% by mass or less and particularly preferably 2% by mass or less, after drying. Although the drying conditions are affected by the thermal strength and carrying speed of the substrate, the length of the drying period, etc., it is favorable to minimize the content of the organic solvent so as to elevate the polymerization ratio.

The hard coat layer may have a multilayer structure which can be formed by appropriately laminating the hard coat layers in the order of hardness.

In the invention, an antireflective layer, which comprises a low refractive index layer and a high refractive index layer and has a high rubfastness, is formed on the hard coat layer thus produced so as to prevent the reflection from the hard coat layer surface. Thus, an antireflective hard coat layer having a high surface hardness can be obtained.

It is preferable that the low refractive index layer and the high refractive index layer in the invention comprise layers mainly made of a hardening resin which hardens upon irradiation with an active beam. Alternatively, It is preferable that the low refractive index layer and the high refractive index layer comprise layers mainly made of a hardening resin which hardens upon irradiation with an active beam together with fine metal oxide particles.

As the hardening resin which hardens upon irradiation with an active energy beam, it is preferable to use a hardening resin having two or more acryl groups in a molecule. Specific examples thereof include polyol polyacrylates such as ethylene glycol diacrylate, 1,6-hexanediol diacrylate, bisphenol A diacrylate, trimethylolpropane triacrylate, ditrimethylolpropane tetraacrylate, pentaerythritol triacrylate, pentaerythritol tetraacrylate, dipentaerythritol pentaacrylate and dipentaerythritol hexaacrylate, polyfunctional urethane acrylates obtained by reacting a polyisocyanate hardening resin with a hydroxyl group-containing acrylate such as hydroxyethyl acrylate, and polyfunctional epoxy acrylates obtained by reacting a polyepoxy hardening resin with a hydroxyl group-containing acrylate (methacrylate). Also, polymers having an ethylenically unsaturated group in a side chain can be used.

Examples of the fine metal oxide particles include particles having an average particle diameter of 100 nm or less, preferably 50 nm or less, being made of titanium dioxide (for example, rutile, rutile/antatase mixed crystals, anatase, amorphous structure), tin oxide, indium oxide, zinc oxide, zirconium oxide and aluminum oxide, and having a refractive index of 1.6 or more. It is favorable to use titanium dioxide since it has a high refractive index and thus available even at a low addition level.

It is preferable to treat the surface of the fine inorganic particles with a surface modifier containing an organic segment so as to elevate the affinity of the fine inorganic particles with organic components. As the surface modifier, it is preferable to use one having a functional group, which can form a bond together with the fine inorganic particles or which can be adsorbed by the fine inorganic particles, and a high affinity with a hardening resin which hardens upon irradiation with an active energy beam.

As the surface modifier having a functional group which can be bonded to or adsorbed by the fine inorganic particles, it is preferable to use those having metal alkoxide hardening resins of silane, aluminum, titanium, zirconium and so on and anionic groups such as phosphate, sulfate, sulfonate and carboxylate groups. Although the functional group having a high affinity with organic components may be one merely having an organic component with a hydrophilic/hydrophobic nature, it is preferable to use a functional group capable of chemically binding to an organic component, still preferably an ethylenically unsaturated group.

Examples of a particularly preferable surface modifier for the fine metal oxide particles to be used in the invention include hardening resins having a metal alkoxide or an anionic group together with an ethylenically unsaturated group in a single molecule and acrylic acid copolymers having an anionic group such as a carboxylate.

As typical examples of these surface modifiers, the following unsaturated double bond-containing coupling agents, phosphate-containing organic hardening resins, sulfate-containing organic hardening resins, carboxylate-containing organic hardening resins and so on may be cited.

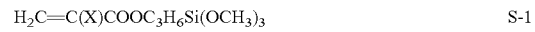
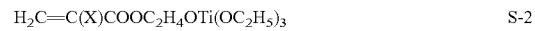
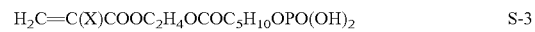

| | |
|---|---|
| $H_2C{=}C(X)COOC_3H_6Si(OCH_3)_3$ | S-1 |
| $H_2C{=}C(X)COOC_2H_4OTi(OC_2H_5)_3$ | S-2 |
| $H_2C{=}C(X)COOC_2H_4OCOC_5H_{10}OPO(OH)_2$ | S-3 |
| $(H_2C{=}C(X)COOC_2H_4OCOC_5H_{10}O)_2POOH$ | S-4 |
| $H_2C{=}C(X)COOC_2H_4OSO_3H$ | S-5 |
| $H_2C{=}C(X)COO(C_5H_{10}COO)_2H$ | S-6 |
| $H_2C{=}C(X)COOC_5H_{10}COOH$ | S-7 |

(wherein X represents H or $CH_3$.)

It is preferable that these fine inorganic particles are surface-modified in a solution. The fine inorganic particles may be mechanically micro-dispersed in the presence of the surface modifier. Alternatively, the surface modifier may be added after micro-dispersing the fine inorganic particles followed by stirring. It is also possible to employ a procedure wherein the fine inorganic particles are preliminarily surface-modified (optionally followed by heating, drying and heating or pH adjustment) and then micro-dispersed.

To prepare the solution in which the surface modifier is dissolved, it is preferable to use an organic solvent having a high polarity. Specific examples thereof include publicly known solvents such as alcohols, ketones and esters.

In the invention, the high refractive index layer is hardened by using radioactive rays, gamma rays, alpha rays, electron beams, ultraviolet rays and so on as the active energy beam. Among all, it is particularly preferable to employ a method wherein a polymerization initiator generating radical using ultraviolet rays is added and then the layer is hardened by ultraviolet rays.

As the polymerization initiator generating radical using ultraviolet rays, use can be made of publicly known radical generators such as acetophenones, benzophenones, Michler's ketone, benzoyl benzoate, benzoins, α-acyloxime esters, tetramethylthiuram monosulfide and thioxanthone. As discussed above, sulfonium salts and iodonium salts, which are usually employed as photoacid generators, act as radical generators upon UV irradiation. Therefore, such a compound may be used alone in the invention. In order to elevate the sensitivity, it is also possible to use a sensitizer. Examples of the sensitizer include n-butylamine, triethylamine, tri-n-butylphosphine and thioxanthone derivatives.

Either a single polymerization initiator or a combination of plural initiators may be used. It is preferable to add the polymerization initiator in an amount of from 0.1 to 15% by mass, still preferably from 1 to 10% by mass, based on the total mass of the ethylenically unsaturated group-containing hardening resin and the ring opening polymerizable group-containing hardening resin contained in the hardening composition.

The refractive index of the high refractive index layer, which comprises the hardening resin which hardens upon irradiation with an active energy beam and the fine metal oxide particles, is preferably 1.6 or more, still preferably 1.65 or more, and higher by 0.2 or more than the refractive index of the low refractive index layer.

In the low refractive index layer, a similar hardening resin to the hardening resin employed in the high refractive index layer which hardens upon irradiation with an active energy beam can be used. It is preferable that the hardened resin has a refractive index of 1.6 or less. As the fine metal oxide particles, it is preferable to use silicon dioxide having a low refractive index.

The refractive index of the low refractive index layer is preferably 1.45 or more but 1.6 or less, still preferably 1.55 or less.

The high refractive index layer and the low refractive index layer are applied each within the range of from 50 to 100 nm. To achieve a high antireflective effect, it is preferable to control the optical distance (refractive index×thickness) to ¼ of the measurement wavelength (in particular, 580 nm).

In the invention, the high refractive index layer and the low refractive index layer can be formed by applying the above-described active energy beam-hardening coating solution in the order of the high refractive index layer and the low refractive index layer by a publicly known film-forming method such as the spinner method, the gravure method or the wire bar method, drying the same and then hardening by irradiating with the active energy beam.

It is preferable that the antireflective layer comprising the high refractive index layer and the low refractive index layer as described above has a reflectance (regular reflectance) of 3.0% or less, still preferably 1.5% or less. In the case where a hard coat layer having a refractive index of 1.53 is formed on a PET film having a refractive index of 1.65, the reflectance at the interface between the PET film and the hard coat is 0.15%. According to the invention, the reflectance can be lowered to 0.02%, namely a decrease in reflectance of 0.13%. An importance of the decrease is increased due to the lowering of the reflectance of the antireflective film.

In the antireflective hard coat layer of the invention, the low refractive index layer may contain a hardening resin containing fluorine and/or silicon or a layer containing a hardening resin containing fluorine and/or silicon may be formed on the low refractive index layer to improve the stain-proofness of the antireflective layer.

As the hardening resin to be added to the low refractive index layer, publicly known hardening fluororesins and hardening silicones and hardening resins having a fluorine/silicon-containing block may be cited. It is preferable to use a hardening resin having a segment highly compatible with resins or metal oxides and another segment containing fluorine or silicon. By adding such a hardening resin to the low refractive index layer, fluorine or silicon can be localized on the surface.

Specific examples of the hardening resin include block copolymers and graft copolymers of monomers containing fluorine or silicon with hydrophilic or lipophilic monomers. Examples of the fluorine-containing monomers include hexafluoroisopropyl acrylate, heptadecafluorodecyl acrylate and perfluoroalkyl group-containing (meth) acrylic acid esters typified by perfluoroalkylsulfonamide ethyl acrylates and perfluoroalkylamide ethyl acrylate. Examples of the silicon-containing monomers include monomers having siloxane group obtained by reacting polydimethylsiloxane with (meth)acrylic acid or the like. Examples of the hydrophilic or lipophilic monomers include (meth) acrylic acid esters such as methyl acrylate, (meth) acrylic acid esters of polyesters having hydroxyl group at the end, hydroxyethyl (meth) acrylate, (meth)acrylic acid esters of polyethylene glycol and so on. Examples of marketed hardening resins include acrylic oligomers having a microdomain structure of a perfluoroalkyl chain such as DEFENSAMCF-300, 312 and 323, oligomers having perfluoroalkyl and lipophilic groups such as MEGAFAC F-170, F-173 and F-175, oligomers having perfluoroalkyl and hydrophilic groups such as MEGAFAC F-171 (manufactured by Dainippon Ink & Chemicals), and fluoroalkyl-based block polymers of vinyl monomers having a segment excellent in surface migration and a segment compatible with resins such as MODIPER FS-700 and 710 (manufactured by NOF Corporation).

To form a stainproof layer on the low refractive index layer, it is preferable to use a hardening resin containing fluorine and having a low surface energy. Specific examples thereof include hardening silicone resins having fluorinated hydrocarbon groups and polymers having fluorinated hydrocarbon groups which are disclosed in JP-A-57-34526, JP-A-2-19801, JP-A-3-170901, etc.

In addition to the antireflective layer as described above, the plastic film according to the invention may have functional layers such as an ultraviolet rays/infrared rays absorption layer, a coloring layer, a selected wavelength-absorption layer and an electromagnetic wave shielding layer laminated together so that it is provided as a functional plastic film with a high hardness.

Preferable examples of the image display unit provided with the plastic film according to the invention include displays such as CRTs, LCDs, FEDs and ELs, touch panels and display screens of mobile game machines. Still preferable examples thereof are flat CRT TV sets wherein the substrate should be made of PET from the viewpoint of preventing breakage and PDPs wherein the substrate is partly made of PET.

EXAMPLES

Now, the invention will be illustrated in greater detail by reference to the following Examples. However, it is to be understood that the invention is not construed as being restricted to these Examples.

<Preliminary Experiment>

In the preliminary experiment as will be described hereinbelow, the relationship between the difference in the refractive index of a substrate and the refractive index of a hard coat layer ($|n_S - n_H|$) and the occurrence of interference spots was examined.

(Coating Solution of Hard Coat Layer)

30.0 parts by mass of fine titanium dioxide particles (TTO-55B manufactured by ISHIHARA SANGYO), 4.5 parts by mass of a monomer having a carboxylate group (Aronix M-5300 manufactured by TOA GOSEI) and 65.5 parts by mass of cyclohexanone were dispersed in a sand grinder mill to give a titanium dioxide dispersion having a mass-average diameter of 55 nm. This titanium dioxide dispersion was blended with dipentaerythritol hexaacrylate (DPHA manufactured by NIPPON KAYAKU) and a photoradical polymerization initiator (IRGACURE 184 manufactured by CIBA-GEIGY) in an amount of 5% based on the total amount of the monomers (i.e., the sum of dipentaerythritol hexaacrylate, the anionic monomer and the cationic monomer). Then the refractive index was adjusted to the level as specified in Table 1.

(Application of Hard Coat Layer)

A PET film (a biaxially oriented polyethylene terephthalate film having a refractive index in the facial direction of 1.65) of 100 μm in thickness was corona-treated in both faces. Then the above-described coating solution was applied onto one face to give a dry film thickness of 5 μm.

TABLE 1

| | Refractive index of hard coat layer $n_H$ | $|n_s - n_x|$ | Interference spots |
|---|---|---|---|
| Pre-experiment 1 | 1.65 | 0 | ⊚ |
| Pre-experiment 2 | 1.62 | 0.03 | ○ |
| Pre-experiment 3 | 1.60 | 0.05 | Δ |
| Pre-experiment 4 | 1.53 | 0.12 | XX |

The interference spots were evaluated by the following method.

Evaluation of interference spots: The back face was rubbed with a sandpaper sheet and then painted with a black marker so as to prevent reflection on the back face. Then the sample was put on a table and irradiated with a three-wavelength fluorescent lamp (NATIONAL PANAC FLUORESCENT LAMP FL20SS•EX-D/18). The interference spots thus observed were evaluated in accordance with the following criteria.

⊚: No interference spot observed.
○: Little interference spots observed.
Δ: Weak interference spots observed.
X: Strong interference spots observed.
XX: Extremely strong interference spots observed.

Based on the above-described results, it was found out that interference spots occurred when the difference between the refractive index of the substrate and the refractive index of the hard coat layer attained 0.03 and became more obvious with an increase in the difference in the refractive indexes.

Examples (Formation of Pet Base Provided with Primer Layer: Substrates 1 to 6)

A PET film (a biaxially oriented polyethylene terephthalate film having a refractive index of 1.65) of 100 μm in thickness was corona-treated in both faces. A latex (PES RESIN A-520 manufactured by TAKAMATSU OIL & FAT) comprising a polyester resin having a refractive index of 1.53 and a glass transition temperature of 55° C. and complex oxides of tin oxide-antimony oxide (SN-38, manufactured by ISHIHARA SANGYO) were mixed together in such a manner as to give the refractive index and film thickness after drying as specified in Table 2. The resultant mixture was applied on one face (A) or both faces (B) of the film to form primer layer(s).

(Formation of Pet Base Provided with Primer Layer: Substrate 7)

(1) Preparation of Organic Solvent-Type Coating Solution for Primer Layer (p-1)

30.0 parts by mass of fine titanium dioxide particles (TTO-55B manufactured by ISHIHARA SANGYO), 4.5 parts by mass of a monomer having a carboxylate group (Aronix M-5300 manufactured by TOA GOSEI) and 65.5 parts by mass of cyclohexanone were dispersed in a sand grinder mill to give a titanium dioxide dispersion having a mass-average diameter of 55 nm. This titanium dioxide dispersion was blended with dipentaerythritol hexaacrylate (DPHA manufactured by NIPPON KAYAKU) and a photoradical polymerization initiator (IRGACURE 184 manufactured by CIBA-GEIGY) in an amount of 5% based on the total amount of the monomers (i.e., the sum of dipentaerythritol hexaacrylate and the anionic monomer). Then the refractive index was adjusted to 1.59.

(2) Formation of Base

A PET film (a biaxially oriented polyethylene terephthalate film having a refractive index of 1.65) of 100 μm in thickness was corona-treated in both faces. Then the coating solution (p-1) was applied onto one face (substrate-7A) or both faces (substrate-7B) to give a dry film thickness of 86 nm.

(Formation of Tac Base Provided with Primer Layer: Substrate 9)

(1) Preparation of Organic Solvent-Type Coating Solution for Primer Layer (p-2)

The procedure employed for preparing the above-described primer layer coating solution (p-1) was followed but adjusting the refractive index of the primer layer to 1.54.

(2) Formation of Base

Using a TAC film (triacetylcellulose film (TAC-TD80U manufactured by Fuji Photo Film having a refractive index of 1.48) of 80 μm in thickness, the above-described coating solution (p-2) was applied onto one face (substrate-9A) or both faces (substrate-9B) to give a dry film thickness of 89 nm.

TABLE 2

| Substrate | | Refractive index of primer layer | Film thickness Of primer layer | Formation of primer layer P | Formation of primer layer Q | Designed λ |
|---|---|---|---|---|---|---|
| Substrate-0 | 100 μm | — | — | no | no | — |
| Substrate-1A | PET | 1.59 | 86 nm | yes | no | 547 nm |
| Substrate-1B | | 1.59 | 86 nm | yes | yes | 547 nm |
| Substrate-2A | | 1.57 | 86 nm | yes | no | 540 nm |
| Substrate-2B | | 1.57 | 86 nm | yes | yes | 540 nm |
| Substrate-3A | | 1.59 | 76 nm | yes | no | 483 nm |
| Substrate-3B | | 1.59 | 76 nm | yes | yes | 483 nm |
| Substrate-4A | | 1.59 | 96 nm | yes | no | 611 nm |
| Substrate-4B | | 1.59 | 96 nm | yes | yes | 611 nm |
| Substrate-5A | | 1.59 | 130 nm | yes | no | 827 nm |
| Substrate-5B | | 1.59 | 130 nm | yes | yes | 827 nm |
| Substrate-6A | | 1.55 | 200 nm | yes | no | 1240 nm |
| Substrate-6B | | 1.55 | 200 nm | yes | yes | 1240 nm |
| Substrate-7A | | 1.59 | 86 nm | yes | no | 547 nm |
| Substrate-7B | | 1.59 | 86 nm | yes | yes | 547 nm |
| Substrate-8 | 80 μm | — | — | No | no | — |

TABLE 2-continued

| | Substrate | Refractive index of primer layer | Film thickness Of primer layer | Formation of primer layer P | Formation of primer layer Q | Designed λ |
|---|---|---|---|---|---|---|
| Substrate-9A | TAC | 1.54 | 89 nm | yes | no | 547 nm |
| Substrate-9B | | 1.54 | 89 nm | yes | yes | 547 nm |

The designed λ given in Table 2 means the value λ employed in determining the film thickness of the primer layer in accordance with the formula (3) wherein the integer N in the formula (3) was referred to as 1.

(Preparation of Coating Solution of Hard Coat Layer (h-1))

Glycidyl methacrylate was dissolved in methyl ethyl ketone (MEK) and reacted while dropping a thermal polymerization initiator at 80° C. The reaction solution thus obtained was dropped into hexane and the precipitate was dried under reduced pressure. To 100 parts by mass of a solution which was prepared by dissolving the thus obtained polyglycidyl methacrylate (molecular weight in terms of polystyrene: 12,000) in methyl ethyl ketone to give a concentration of 50% by mass, was added under stirring a solution of 150 parts by mass of trimethylolpropane triacrylate (VISCOAT #295 manufactured by OSAKA ORGANIC CHEMICAL INDUSTRY), 6 parts by mass of a photo radical polymerization initiator (IRGACURE 184 manufactured by CIBA-GEIGY) and 6 parts by mass of a photo cation polymerization initiator (RHODOSIL 1074 manufactured by RHODIA) dissolved in 30 parts by mass of methyl isobutyl ketone, thereby giving a hard coat layer coating solution. The refractive index of the hard coat layer after hardening was adjusted to 1.53.

(Preparation of Coating Solution for Hard Coat Layer (h-2))

30.0 parts by mass of fine titanium dioxide particles (TTO-55B manufactured by ISHIHARA SANGYO), 4.5 parts by mass of a monomer having a carboxylate group (Aronix M-5300 manufactured by TOAGOSEI) and 65.5 parts by mass of cyclohexanone were dispersed in a sand grinder mill to give a titanium dioxide dispersion having a mass-average diameter of 55 nm. This titanium dioxide dispersion was blended with dipentaerythritol hexaacrylate (DPHA, manufactured by NIPPON KAYAKU) and a photoradical polymerization initiator (IRGACURE 184 manufactured by CIBA-GEIGY) in an amount of 5% based on the total amount of the monomers (i.e., the sum of dipentaerythritol hexaacrylate and the anionic monomer).

Then the refractive index after hardening was adjusted to 1.60.

(Formation of Hard Coat Film)

The hard coat layer coating solution as described above was applied onto the primer layer P of the above-described film provided with primer layer by the extrusion method in such a manner as to give each thickness specified in Table 3. Then it was dried and irradiated with UV rays (700 mJ/cm$^2$) to thereby harden the hard coat layer. Thus, a hard coat film was formed.

The obtained hard coat films were evaluated in the following manner. Table 3 summarizes the evaluation results.

Pencil hardness test: The hardness in a pencil-scratching test was determined as follows. The hard coat film obtained above was conditioned at a temperature of 25° C. under a relative humidity of 60% for 2 hours and then subjected to the pencil hardness evaluation test specified in JIS-K-5400 with the use of pencils for the test according to JIS-S-6006. The pencil hardness was expressed in the hardness of a pencil causing no scratch mark under a load of 9.8N.

Evaluation of haze: The haze of the thus formed hard coat film was measured by using a haze meter MODEL 1001DP (manufactured by NIPPON DENSHOKU).

Interference spots were evaluated by the same method as the one employed in the preliminarily experiment.

TABLE 3

| | Substrate | Hard coat coating solution | Hard coat layer film thickness | Reflection (%) at interface | Pencil hardness | Haze | Interference spot |
|---|---|---|---|---|---|---|---|
| Ex. 1A | substrate-1A | h-1 | 40 μm | 0.0001 | 5H | 0.4% | ◉ |
| Ex. 1B | substrate-1B | h-1 | 40 μm | 0.0001 | 5H | 0.6% | ◉ |
| Ex. 2A | substrate-2A | h-1 | 40 μm | 0.014 | 5H | 0.3% | ○ |
| Ex. 3A | substrate-3A | h-1 | 40 μm | 0.0045 | 5H | 0.3% | ◉ |
| Ex. 4A | substrate-4A | h-1 | 40 μm | 0.0051 | 5H | 0.5% | ◉ |
| Ex. 5B | substrate-1B | h-1 | 5 μm | 0.0001 | 2H | 0.6% | ○ |
| Ex. 6A | substrate-3A | h-1 | 5 μm | 0.0045 | 2H | 0.6% | ○ |
| Ex. 7A | substrate-7A | h-1 | 40 μm | 0.0001 | 5H | 0.4% | ◉ |
| Ex. 8A | substrate-3A | h-1 | 20 μm | 0.0045 | 2H | 0.6% | ◉ |
| Ex. 9A | substrate-9A | h-2 | 5 μm | 0.0001 | H | 0.6% | ◉ |
| C. Ex. 1 | Substrate-0 | h-1 | 40 μm | 0.14 | 5H | 0.2% | X |
| C. Ex. 2 | Substrate-0 | h-1 | 5 μm | 0.14 | 2H | 0.4% | XX |
| C. Ex. 3A | substrate-5A | h-1 | 40 μm | 0.075 | 5H | 0.4% | Δ |
| C. Ex. 4B | substrate-6B | h-1 | 40 μm | 0.13 | 5H | 0.6% | X |
| C. Ex. 5B | substrate-6B | h-1 | 5 μm | 0.13 | 2H | 0.6% | XX |
| C. Ex. 8 | substrate-8 | h-2 | 5 μm | 0.15 | H | 0.6% | XX |

The reflectance at the interface as shown in Table 3 means the average reflectance at the interface between the hard coat layer and the substrate. Namely, it was determined by calculating the field reflectances at the top and bottom faces of the primer layer in accordance with Fresnel's formula, synthesizing two reflection waves considering the phase difference resulted from the primer layer film thickness and the wavelength and calculating the average of energy reflectances per nm within a range of 540 to 550 nm.

The data given Table 3 indicate the following facts.

In the hard coat films having the PET film as the substrate and provided with the hard coat layer made of the organic compound having a refractive index of 1.53, the hard coat films of Examples 1A to 7A having the primer layer according to the invention showed no interference spot under the three-wavelength fluorescent lamp. In contrast, those having no primer layer (Comparative Examples 1 and 2) and those provided with the conventional primer layer (Comparative Examples 4B and 5B) showed extremely strong interference spots.

In the hard coat films having the TAC film as the substrate and provided with the high refractive index (1.60) hard coat layer, the hard coat film of Example 9A having the primer layer according to the invention showed no interference spot under the three-wavelength fluorescent lamp. In contrast, the one having no primer layer (Comparative Example 8) showed extremely strong interference spots.

In the cases of designing λ as 540 nm (Examples 1A, 1B, 7A and 9A), no interference spot was observed, which indicates that it is preferable to design a primer layer fitting for the green ray among visible rays.

In the case of using the same substrate, less interference spots were observed with an increase in the film thickness of the hard coat layer. It is efficacious in coping with the problem of interference spots to combine a hard coat layer of 10 μm or more with the primer layer according to the invention (comparison of Example 3A with Examples 6A and 8A, comparison of Comparative Example 1 with Comparative Example 2).

[Application of Hard Coat Film to Antireflective Film]

(Formation of Antireflective Layer)

(1) Preparation of Coating Solution of High Refractive Index Layer (a-1)

30.0 parts by mass of fine titanium dioxide particles (TTO-55B manufactured by ISHIHARA SANGYO), 4.5 parts by mass of a monomer having a carboxylate group (Aronix M-5300 manufactured by TOAGOSEI) and 65.5 parts by mass of cyclohexanone were dispersed in a sand grinder mill to give a titanium dioxide dispersion having a mass-average diameter of 55 nm. This titanium dioxide dispersion was blended with dipentaerythritol hexaacrylate (DPHA manufactured by NIPPON KAYAKU) and a photoradical polymerization initiator (IRGACURE 184 manufactured by CIBA-GEIGY) in an amount of 5% based on the total amount of the monomers (i.e., the sum of dipentaerythritol hexaacrylate, the anionic monomer and the cationic monomer). Then the refractive index was adjusted to 1.85.

(2) Preparation of Coating Solution of Low Refractive Index Layer (a-2)

A coating solution of low refractive index layer was prepared by mixing under stirring 60 parts by mass of pentaerythritol tetraacrylate (PETA, manufactured by NIPPON KAYAKU), 2 parts by mass of a photoradical polymerization initiator (IRGACURE 184 manufactured by CIBA-GEIGY), 9 parts by mass of MEGAFAC 531A ($C_8F_{17}SO_2N(C_3H_7)CH_2CH_2OCOCH=CH_2$, manufactured by Dainippon Ink & Chemicals) and methyl ethyl ketone.

The refractive index was controlled to 1.53 by adding a dispersion of fine silicon oxide particles having amass-average particle diameter of 12 nm prepared by dispersing 30.0 parts by mass of fine silicon dioxide particles (AEROSIL 200 manufactured by NIPPON AEROSIL), 4.5 parts by mass of a carboxylate group-containing monomer (Aronix M-5300 manufactured by TOAGOSEI) and 65.5 parts by mass of cyclohexanone in a sand grinder mill.

Next, the coating solutions were prepared, applied and exposed on the hard coat layers of the hard coat films so as to give the film thick nesses and refractive indexes respectively listed in Table 4. Thus antireflective hard coat films A to D (C and D were provided for comparison) were formed. Table 4 summarizes the properties of these antireflective hard coat films. The coating solutions were applied and exposed as in the case of forming the hard coat layers.

TABLE 4

| Antireflective film | Hard coat film | High refractive index layer | | Low refractive index layer | | Surface reflectance | Interference spot |
| --- | --- | --- | --- | --- | --- | --- | --- |
| | | Thickness nm | Refractive index | Thickness nm | Refractive index | | |
| A | Ex. 1B | 75 | 1.85 | 90 | 1.53 | 1.2 | ◉ |
| B | Ex. 5B | 75 | 1.85 | 90 | 1.53 | 1.2 | ○ |
| C | C. Ex. 4B | 75 | 1.85 | 90 | 1.53 | 1.3 | X |
| D | C. Ex. 5B | 75 | 1.85 | 90 | 1.53 | 1.3 | XX |

The surface reflectance shown in Table 4 was measured in the following manner.

Measurement of surface reflectance: A sample was formed by rubbing the back face with a sandpaper sheet and then painting with a black marker so as to prevent reflection on the back face. Then the surface reflectance of the regular reflection of a 5° incidenting light within a wavelength range of form 450 to 650 nm was measured with the use of a spectrophotometer (manufactured by JASCO).

As Table 4 shows, no interference spot was observed under the three-wavelength fluorescent lamp in the antireflective films with the use of the hard coat films according to the invention. In the cases of the conventional hard coat films shown in Comparative Examples, on the other hand, interference spots were still strongly observed under the three-wavelength fluorescent lamp even after providing the antireflective layer on the hard coat layer.

[Construction of Glass Plate Having Antireflective Hard Coat Films Bonded to Both Faces]

As shown in Table 5, antireflective hard coat films listed in Table 4 were bonded to the front and back faces of a glass plate of 3 mm in thickness, in which an acrylic pressure-sensitive adhesive having a refractive index of 1.52 was provided on the face of the substrate in the opposite side to the face having the antireflective layer. Table 5 summarizes the results of the reflectance measurement and evaluation of interference spots using these glass plates.

TABLE 5

| | Bonded film (front) | Bonded film (back) | Average integrated reflectance | Interference spot |
|---|---|---|---|---|
| S-1 | A | A | 4.0% | ⊚ |
| S-2 | B | B | 4.0% | ○ |
| S-3 | C | C | 4.8% | X |
| S-4 | D | D | 4.8% | XX |

The average integrated reflectance as shown in Table 5 was determined according to the method of JIS-R-3106. Interference spots were evaluated as in the preliminarily experiment described above.

Based on the results shown in Table 5, the following fact can be understood.

The double-faced antireflective hard coat film-bonded glass plates having the primer layer according to the invention showed low reflectances and free from the occurrence of interference spots. On the other hand, the samples (S-3) and (S-4) having the conventional primer layer showed high reflectances and interference spots were strongly observed therein.

[Application of Antireflective Film to PDP Front Panel]

An antireflective film attached to the surface of the front panel of plasma displays (PDP-433HD-U manufactured by Pioneer) was stripped off. Then the hard coat films A and C (10 cm×10 cm) shown in Table 4 were bonded to the center of the panel of the displays, which were located adjacent to each other, in such a manner that the antireflective layer served as the uppermost layer in each case, by using an acrylic pressure-sensitive adhesive having a refractive index of 1.52. Subsequently, the device was observed in a room under a fluorescent lamp (NATIONAL PALOOK FLUORESCENT LAMP FL40SS•EX-D/37) employed as a room lamp. The display provided with the antireflective hard coat film A showed a favorable visibility with no interference spot, while strong interference spots were observed in the case of the display provided with the antireflective hard coat film C. Based on these results, it can be understood that the antireflective hard coat film obtained by the invention is appropriate for the front panel of a PDP which is an image display unit.

[Construction of Transparent Plastic Film Provided with Pressure-Sensitive Adhesive Layer]

(Formation of Pet Films Provided with Primer Layer for Examples 21 to 26 and Comparative Examples 23 and 24)

PET films (biaxially oriented polyethylene terephthalate films having a refractive index of 1.65) of 100 μm or 50 μm in thickness were corona-treated in both faces. Alatex (PES RESIN A-520 manufactured by TAKAMATSU OIL & FAT) comprising a polyester resin having a refractive index of 1.53 and a glass transition temperature of 55° C. and complex oxides of tin oxide-antimony oxide (SN-38, manufactured by ISHIHARA SANGYO) were mixed together in such a manner as to give the refractive index and film thickness after drying as specified in Table 6. The resultant mixture was applied on one face of the films to form a primer layer, thereby giving PET films provided with the primer layer for Examples 21 to 26 and Comparative Examples 23 and 24.

(Formation of PET Film Provided with Primer Layer for Example 27)

A PET film (biaxially oriented polyethylene terephthalate film having a refractive index of 1.65) of 100 μm in thickness was corona-treated in both faces. Then the above-described coating solution (p-1) was applied on one face of the film in such a manner as to give a film thickness of 86 nm after drying, thereby giving a PET film provided with the primer layer for Example 27.

(Formation of PET Film Provided with Primer Layer for Example

28) Similar to Examples 21 to 24, a PET film of 100 μm in thickness was coated in one face so as to give a refractive index of 1.65 and a film thickness of 200 nm after drying. Then, the above-described coating solution (p-1) was further applied in such a manner as to give a film thickness of 86 nm after drying, thereby giving a film for Example 28.

(Formation of PET Film Provided with Primer Layer for Example 29 and Comparative Example 26)

(1) Preparation of Organic Solvent-Type Coating Solution for Primer Layer (p-2)

Cyclohexanone was mixed with dipentaerythritol hexaacrylate (DPHA manufactured by NIPPON KAYAKU) and a photoradical polymerization initiator (IRGACURE 184 manufactured by CIBA-GEIGY) in an amount of 5% based on dipentaerythritol hexaacrylate. (The viscosity was adjusted with cyclohexanone to give a favorable coating performance.)

(2) Formation of PET Film Provided with Primer Layer

On a PET film of 100 μm in thickness, the primer layer serving as the first layer was formed as in Example 21 and Comparative Example 24. Next, the coating solution p-2 was applied thereon to give a dry film thickness of 2μ, thereby giving the PET film for Example 29 and Comparative Example 26.

An acrylic pressure-sensitive adhesive layer (refractive index 1.53, thickness 30 μm, haze 0.1%) provided with release paper was bonded to each of the above-described PET films having the primer layer for Examples 21 to 29 and Comparative Examples 21 to 26 in the side having the primer layer overlaid thereon. Thus, transparent plastic films provided with the pressure-sensitive adhesive layer were obtained.

(Evaluation of Interference Spots)

The interference spots were evaluated by the following method.

Evaluation of interference spots: After stripping off the release paper, the transparent films provided with the pressure-sensitive adhesive layer for Examples 21 to 28 and Comparative Examples 21 to 25 as described above were each bonded to a glass plate of 1 mm in thickness and then placed on a black paper sheet on a table while making the glass plate downward. Then the sample was irradiated a three-wavelength fluorescent lamp (NATIONAL PALOOK FLUORESCENT LAMP FL20SS•EX-D/18) located 30 cm above. The interference spots thus observed were evaluated in accordance with the following criteria.

⊚: No interference spot observed.
○: Little interference spots observed.
Δ: Weak interference spots observed.
X: Strong interference spots observed.
XX: Extremely strong interference spots observed.

(Evaluation of Haze)

Evaluation of haze: After stripping off the release paper, the transparent films provided with the pressure-sensitive adhesive layer (Examples 21 to 28 and Comparative Examples 21 to 25) as described above were each bonded to a glass plate of 1 mm in thickness. Then the haze was measured by using a haze meter MODEL 1001DP (manufactured by NIPPON DENSHOKU).

TABLE 6

| | Substrate | | Primer layer | | Designed λ | Reflection (%) at interface | Haze (%) | Interference spot |
|---|---|---|---|---|---|---|---|---|
| | Substrate | Thickness | Refractive index | Film thickness | | | | |
| Ex. 21 | PET | 100 μm | 1.59 | 86 nm | 547 nm | 0.0001 | 0.3 | ◎ |
| Ex. 22 | PET | 50 μm | 1.59 | 86 nm | 547 nm | 0.0001 | 0.3 | ◎ |
| Ex. 23 | PET | 100 μm | 1.57 | 86 nm | 540 nm | 0.014 | 0.3 | ○ |
| Ex. 24 | PET | 100 μm | 1.59 | 76 nm | 483 nm | 0.0045 | 0.3 | ◎ |
| Ex. 25 | PET | 50 μm | 1.59 | 76 nm | 483 nm | 0.0045 | 0.3 | ○ |
| Ex. 26 | PET | 100 μm | 1.59 | 96 nm | 611 nm | 0.0051 | 0.3 | ◎ |
| Ex. 27 | PET | 100 μm | 1.59 | 86 nm | 547 nm | 0.0001 | 0.3 | ◎ |
| Ex. 28 | PET | 100 μm | 1.65/1.59 | 200 nm/86 nm | 547 nm | 0.0001 | 0.4 | ◎ |
| Ex. 29 | PET | 100 μm | 1.59/1.53 | 86 nm/2 μm | 547 nm | 0.0001 | 0.4 | ◎ |
| C. Ex. 21 | PET | 100 μm | — | — | — | 0.014 | 0.3 | X |
| C. Ex. 22 | PET | 50 μm | — | — | — | 0.014 | 0.3 | XX |
| C. Ex. 23 | PET | 100 μm | 1.59 | 130 nm | 827 nm | 0.075 | 0.3 | Δ |
| C. Ex. 24 | PET | 100 μm | 1.55 | 200 nm | 1240 nm | 0.13 | 0.3 | X |
| C. Ex. 25 | PET | 100 μm | 1.55/1.59 | 200 nm/86 nm | 1240 nm | 0.14 | 0.3 | X |
| C. Ex. 26 | PET | 100 μm | 1.55/1.53 | 200 nm/2 μm | 1240 nm | 0.14 | 0.3 | X |

* In Examples 28 and 29 and Comparative Examples 25 and 26, the refractive indexes and the film thicknesses are indicated in order of being close to the substrate.

The designed λ given in Table 6 means the value λ employed in determining the film thickness of the primer layer in accordance with the formula (6) wherein the integer N in the formula (6) was referred to as 1.

The reflectance at the interface means the average reflectance at the interface between the pressure-sensitive adhesive layer and the substrate. Namely, it was determined by calculating the field reflectances at the top and bottom faces of the primer layer in accordance with Fresnel's formula, synthesizing two reflection waves considering the phase difference resulted from the primer layer film thickness and the wavelength and calculating the average of energy reflectances per nm within a range of 540 to 550 nm.

The results concerning the interference spots shown in Table 6 clearly indicate the following facts.

The transparent plastic films according to the invention bonded to the glass plate showed no interference spot under the three-wavelength fluorescent lamp. In contrast, very strong interference spots were observed in the cases using as the substrate the films having no primer layer (Comparative Examples 21 and 22) or provided with the conventional primer layer (Comparative Example 24).

Stronger interference spots were observed at the lower thickness of the transparent plastic film substrate (Comparison of Example 24 with Example 25, Comparative Example 21 with Comparative Example 22).

In the cases of designing λ as 547 nm (Examples 21, 22, 27 and 28), no interference spot was observed, which indicates that it is preferable to design a primer layer fitting for the green ray among visible rays.

In Examples 28 and 29, no interference spot was observed under the three-wavelength fluorescent lamp. When a primer layer having a refractive index of 1.55 was overlaid on the substrate and another primer layer was further provided thereon (Comparative Examples 25 and 26), very strong interference spots were observed.

According to the invention, a plastic film being free from any interference spots and showing a favorable visibility even under a three-wavelength fluorescent lamp can be obtained by forming a primer layer having a specific refractive index and functional layer on a high refractive index substrate film. Use of the plastic film according to the invention makes it possible to provide a transparent functional film being free from any interference spots even under a three-wavelength fluorescent lamp. The plastic film according to the invention is appropriate for the substrate of antiscattering films for glass, pressure-sensitive adhesive tapes and transparent stickers. The transparent functional film as described above is appropriate for protective films for the surface and touch panels of image display units such as CRTs, LCDs, PDPs and FEDs, glass plates, plastic plates and so on.

This application is based on Japanese Patent application JP2003-085460, filed Mar. 26, 2003, the entire content of which is hereby incorporated by reference, the same as if set forth at length.

The invention claimed is:

1. A plastic film comprising a transparent plastic substrate, a primer layer and a pressure-sensitive adhesive layer in this order wherein a refractive index $n_S$ of the substrate and a refractive index $n_H$ of the pressure-sensitive adhesive layer satisfy the following formula (1):

$$0.03 \leq |n_s - n_H| \tag{1}$$

and an average reflectance of light of from 540 to 550 nm in wavelength incidenting perpendicular onto a face of the film at an interface among the functional layer and the substrate is 0.02% or less.

2. The film according to claim 1, which further comprises a hard coat layer at the side of the transparent plastic substrate that is opposite to the side at which the pressure-sensitive layer is provided.

3. The film according to claim 1, which further comprises an antireflective layer.

4. An image display unit comprising the film according to claim 1.

5. The film according to claim 1, which further comprises a primer layer and a hard coat layer at the side of the transparent plastic substrate that is opposite to the side at which the pressure-sensitive layer is provided.

6. The film according to claim 1, wherein the pressure-sensitive adhesive layer, a first primer layer, the transparent plastic substrate, a second primer layer and a hard coat layer are provided in this order.

7. A plastic film comprising a transparent plastic substrate, a primer layer and a pressure-sensitive adhesive layer in this order wherein a refractive index $n_s$ of the substrate and a refractive index $n_H$ of the pressure-sensitive adhesive layer satisfy the following formula (1):

$$0.03 \leq |n_s - n_H| \qquad (1)$$

and the primer layer has a refractive index $n_p$ and a film thickness $d_P$ satisfying the following formulae (2) and (3):

$$\sqrt{n_s \times n_H} - \frac{|n_s - n_H|}{4} \leq n_P \leq \sqrt{n_S \times n_H} + \frac{|n_s - n_H|}{4} \qquad (2)$$

$$d_P = (2N - 1) \times \lambda / (4n_P) \qquad (3)$$

wherein $\lambda$ represents a visible light wavelength ranging from 450 nm to 650 nm; while N represents a positive integer.

8. The film according to claim 7, which further comprises a hard coat layer at the side of the transparent plastic substrate that is opposite to the side at which the pressure-sensitive layer is provided.

9. The film according to claim 7, which further comprises an antireflective layer.

10. An image display unit comprising the film according to claim 7.

11. The film according to claim 7, which further comprises a primer layer and a hard coat layer at the side of the transparent plastic substrate that is opposite to the side at which the pressure-sensitive layer is provided.

12. The film according to claim 7, wherein the pressure-sensitive adhesive layer, a first primer layer, the transparent plastic substrate, a second primer layer and a hard coat layer are provided in this order.

* * * * *